United States Patent Office 2,966,798
Patented Jan. 3, 1961

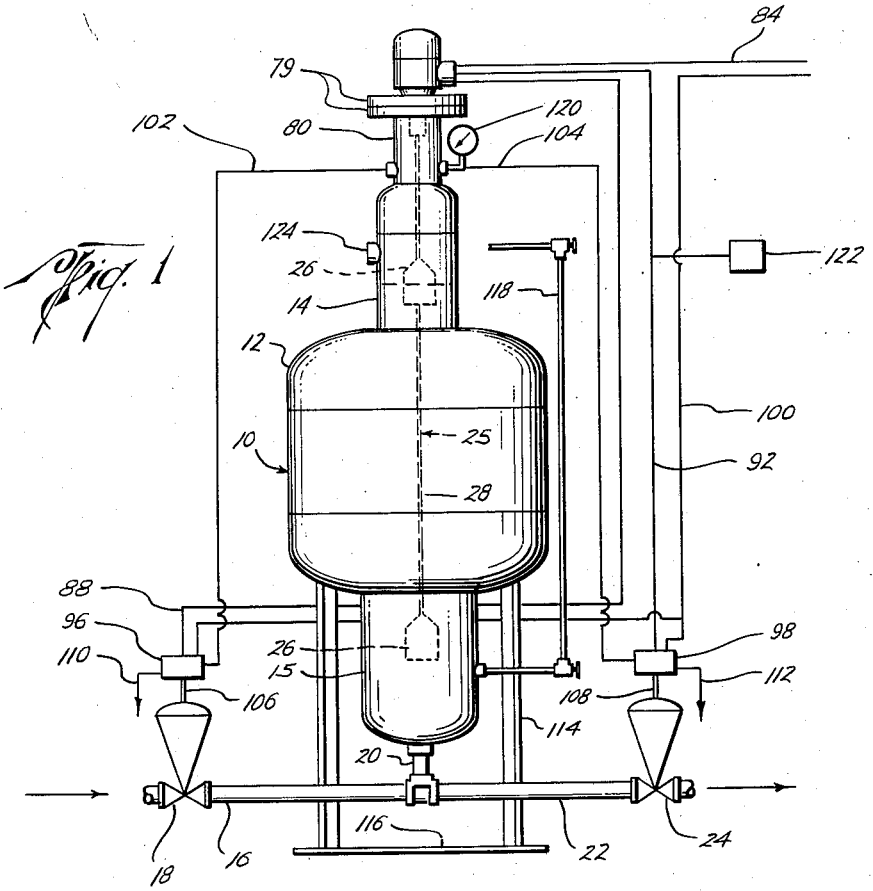
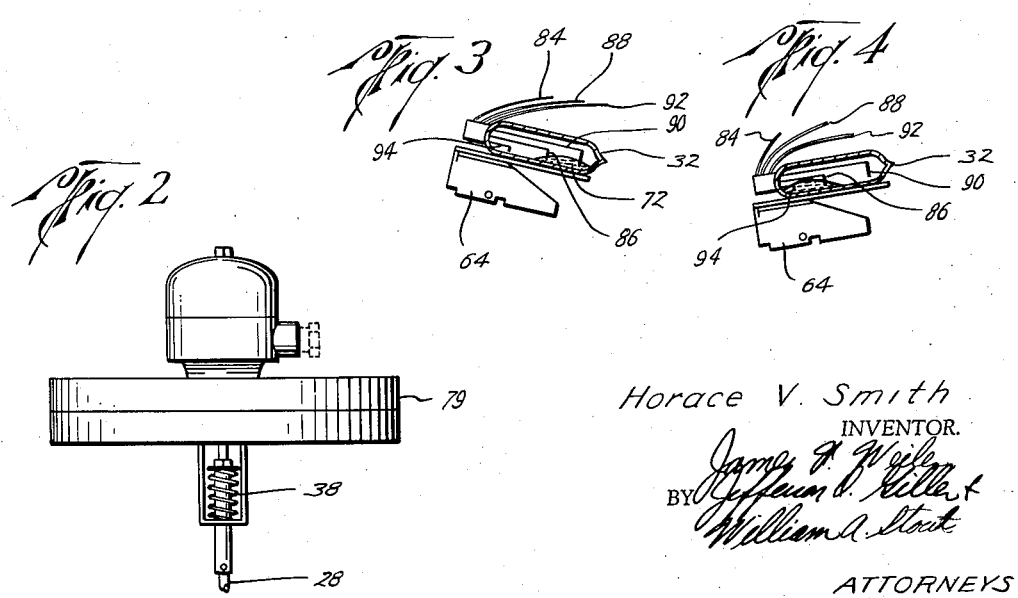

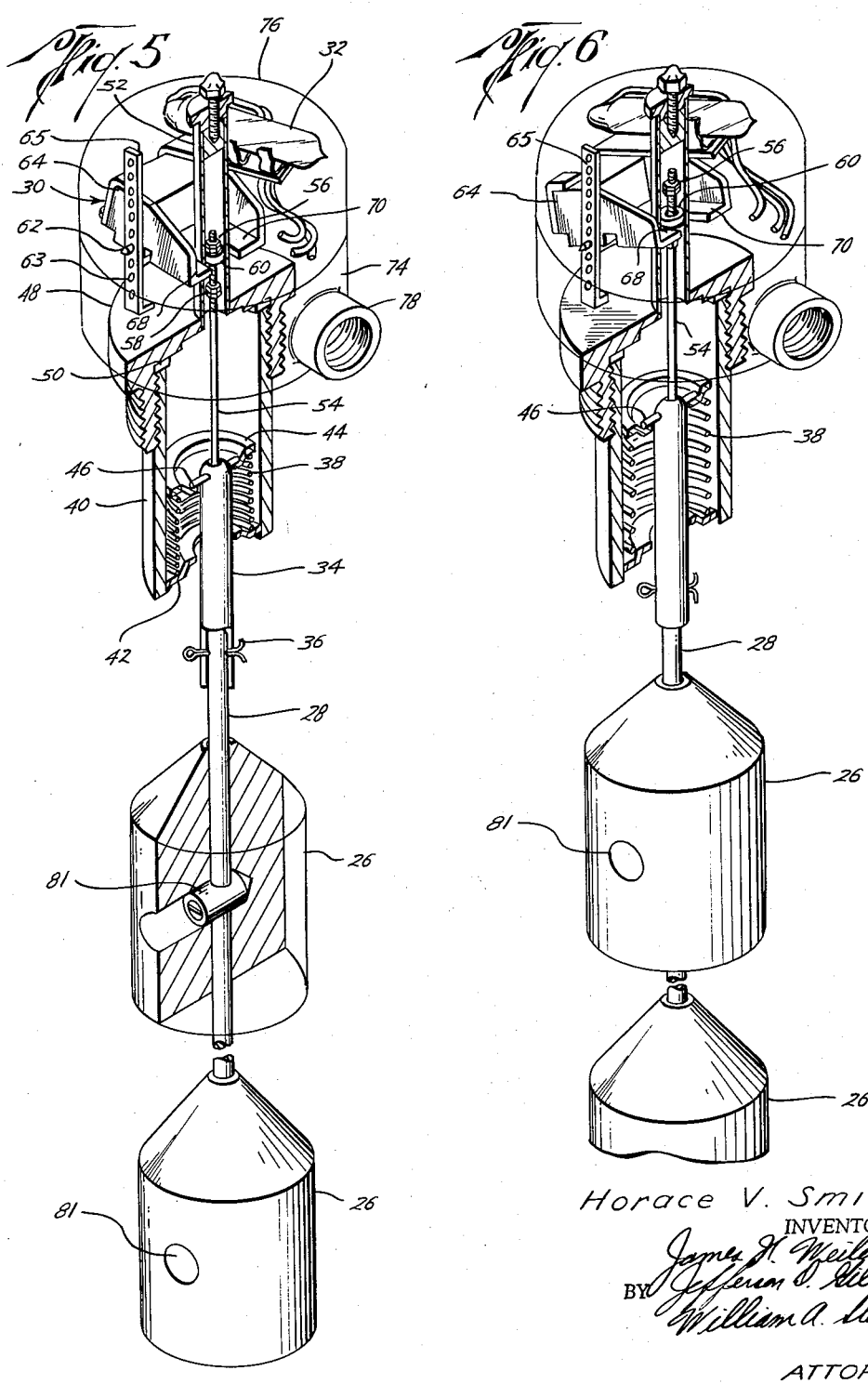

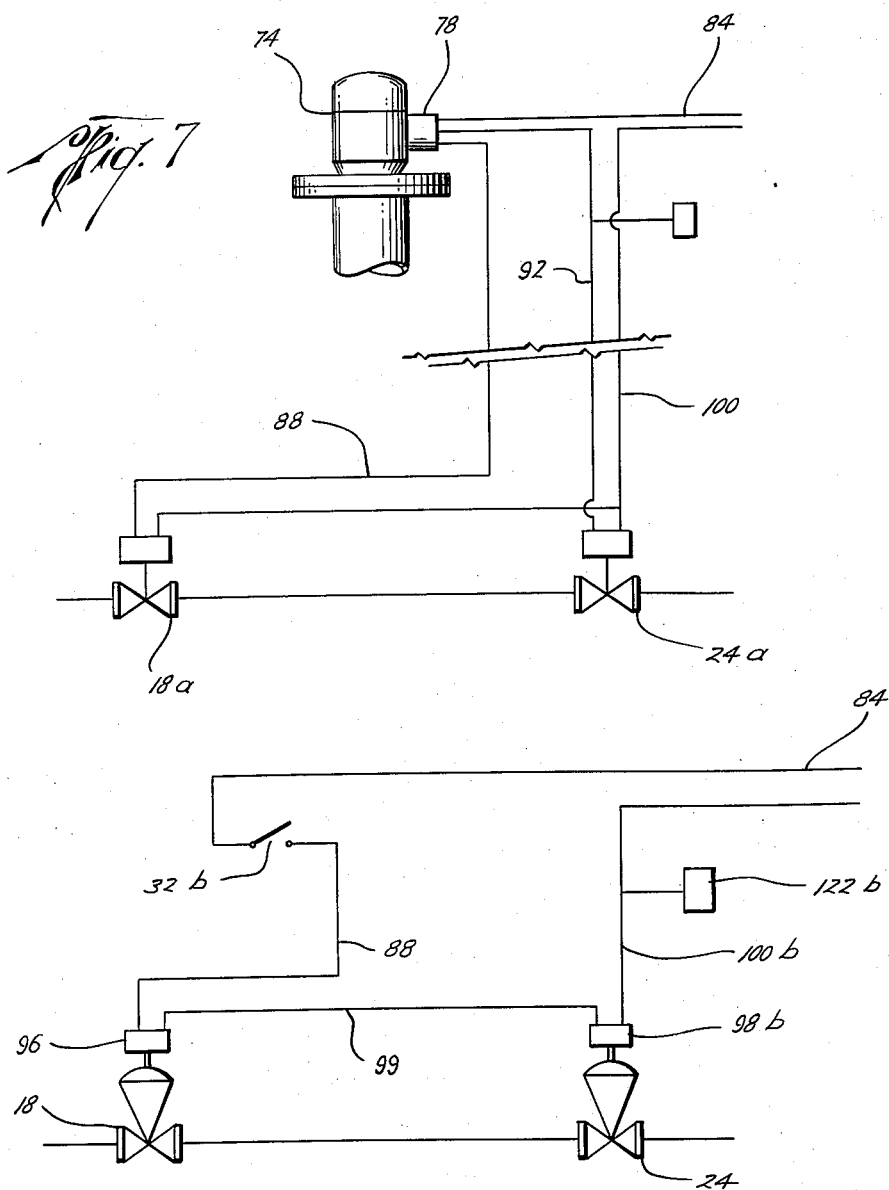

2,966,798

ELECTRICALLY CONTROLLED LIQUID METERING APPARATUS

Horace V. Smith, Houston, Tex., assignor to Oil Metering and Processing Equipment Corp., Houston, Tex., a corporation of Texas Filed Sept. 12, 1957, Ser. No. 683,494

8 Claims. (Cl. 73—224)

The present invention relates to an improved liquid metering apparatus and, more particularly to an improved liquid metering apparatus having electrical controls which apparatus may be used for accurately metering relatively large volumes of liquid such as in connection with oil and gas wells and gathering systems.

In common use in metering liquids such as from oil and gas wells there are metering apparatus which have a chamber which automatically fills and empties with each such cycle being counted. The valves which control the filling and emptying of the chamber are normally controlled by a float which has mechanical linkage connected directly from the float to the valves or from the float to a pneumatic system which pneumatic system in turn directly actuates the valves. However, as such apparatus are often operated under pressure it is necessary that the mechanical linkage connected to the control float pass through a stuffing box to prevent leakage of fluid from inside the chamber. Such stuffing boxes do not always prevent the escape of fluid and further introduce friction into the linkage which often varies thereby causing the floats to operate the linkage at different liquid levels in the chamber resulting in inaccuracies of measurement. Further, in the use of pneumatic controls to operate the inlet and outlet valves there is often a lag in the operation of the valves which is undesirable when highly accurate metering is required due to the compressibility of the gas in the pneumatic control systems. Additionally the use of pneumatic controls sometimes results in the fouling of the controls as the gas in the pneumatic system may carry with it foreign particles. It is to overcome these disadvantages that the present invention is directed.

Accordingly, it is a major object of the present invention to provide an improved metering apparatus which accurately and efficiently meters large volumes of liquid under pressure such as in connection with oil from oil and gas wells and gathering systems therefor and the like.

Another object of the present invention is the provision of such a metering apparatus including switch control means operated by a buoyancy member which switch control means controls a switch in an electrical system controlling inlet and outlet valves and which switch control is separated from the liquid container by an imperforate member.

Another object of the present invention is the provision of such a metering apparatus including a magnetic switch control means operated by a buoyancy member which magnetic switch control means magnetically controls a switch assembly in an electrical system controlling inlet and outlet valves.

Yet a further object of the present invention is the provision of a metering apparatus which includes a metering vessel having reduced or Seraphin necks extending above and below each end of a main liquid compartment into which necks is positioned a rigid buoyancy member for actuating electrical valve controls regulating inflow and outflow of liquid to and from the metering apparatus.

A further object of the present invention is the provision of a metering apparatus of the character described having electrically actuated inlet and outlet valves.

A still further object of the present invention is the provision of such a metering apparatus having a metering vessel with upper and lower portions of different volume whereby the metering apparatus may be calibrated by adjustments exterior of portions of the apparatus to which the liquid being metered has access.

Yet a further object of the present invention is the provision of such a metering apparatus which is relatively inexpensive to manufacture, maintain and repair and is dependable in operation.

Other and further objects, features and advantages will be apparent from the following description of presently preferred examples of the invention, given for the purposes of disclosure and taken in conjunction with the accompanying drawings, where like character references designate like parts throughout the several views, and where;

Figure 1 is a side view, partly diagrammatic, illustrating the metering apparatus of the present invention.

Figure 2 is an enlarged fragmentary side view, partly in section, illustrating the preferred mounting of a magnetic switch control assembly on the liquid container, Figure 3 is an enlarged fragmentary side view of the switch assembly shown in low liquid level position, Figure 4 is an enlarged fragmentary side view of the switch assembly shown in high liquid level position, Figure 5 is a perspective view, partly in section, illustrating the buoyancy member, magnetic switch control means, and switch assembly in low liquid level position, Figure 6 is a perspective view, partly in section, illustrating the buoyancy member, magnetic switch control means, and switch assembly in high liquid level position, Figure 7 is a fragmentary diagrammatic view illustrating the use of a modification incorporating electric motor valves, and Figure 8 is a wiring diagram of a modification in which a single electrical circuit controls both the inlet and outlet valves.

Referring now to the drawings, and particularly to Figure 1, a liquid container or metering vessel 10 is provided which has the main liquid compartment or centrally enlarged body portion 12 with upper and lower mutually aligned liquid compartments 14 and 15 of reduced diameter. The reduced diameter liquid compartments 14 and 15 are known in the trade as Seraphin necks. The general shape of the vessel 10 with the enlarged main liquid compartment 12 and reduced diameter liquid compartments 14 and 15 is standard conventional practice in the art.

A liquid inlet line 16 controlled by an inlet valve element here shown as the inlet valve 18 is connected to the flow line 20 extending into the liquid container or metering vessel 10 at its lower portion. Similarly, a liquid outlet line 22 controlled by an outlet valve element here shown as the outlet valve 24 is also connected to the flow line 20. Thus, upon simultaneous actuation of the valves 18 and 24, liquids, such as oil, fill or drain from the liquid container 10.

Disposed within the liquid container 10 are means movable in response to changing liquid levels in the liquid container 10 to actuate controls for the inlet and outlet valves 18 and 24. This movable means may be of several types of floats and buoyancy masses well known to the art. The preferable form here illustrated is a buoyancy member 25 comprised of a pair of spaced buoyancy masses 26 one each of which is disposed in each reduced diameter liquid compartments 14 and 15 of the liquid container 10. These divided buoyancy masses are rigidly connected together by a rod 28. In operation the divided buoyancy masses 26 never move out of their respective reduced diameter liquid compartments 14 and 15, thereby insuring highly accurate results.

The use of metering vessel 10, of the inlet and outlet lines 16 and 22 and inlet and outlet valves, and of means movable in liquid container in response to the liquid level for controlling inlet and outlet valves are not themselves the invention and many variations and modifications thereof will suggest themselves to those skilled in the art.

The buoyancy member 25 actuates a switch control assembly at the upper end of the upper reduced neck 14 which switch control assembly controls an electrical system actuating the inlet valve 18 and the outlet valve 24 simultaneously. Referring to Figures 5 and 6 there is best illustrated the preferred form of switch control assembly which is a magnetic switch control generally indicated by the numeral 30 which tilts the single pole double throw mercury switch 32 between the positions illustrated in Figures 3 and 4.

Referring again to Figures 5 and 6, the rod 28 extends through the top of the upper buoyancy mass 26 and is secured to a connecting link 34 such as by the cotter key 36. The upper end of the connecting link 34 projects axially through a compression spring 38 supported in the lower end of a spring cylinder 40 by the annular spring stop 42.

Resting on the upper end of the compression spring 38 is an annular guide washer 44 which is vertically movable within the spring cylinder 40. The buoyancy member 25 is supported on this compression spring 38 by a support pin 46 passing transversely through the connecting link 34 and resting on the upper surface of the guide washer 44. The foregoing structure recited in this paragraph is all part of a means movable in response to the liquid level in the liquid container 10.

Sealing the upper end of the spring cylinder 40 is a threaded cap 48 provided with a packing ring 50 to prevent the escape of fluid from between the spring cylinder 40 and the cap 48. A sealed pressure tight non-magnetic enclosing tube 52 is secured to and extends upwardly from the cap 48. This enclosing tube 52 forms an imperforate barrier between the metering vessel 10 and the switch 32. This enclosing tube 52 is directly over and aligned with the rod 28 extending upwardly from the upper buoyancy mass 26. The upper end of this enclosing tube 52 is tightly sealed but is open at its lower end to the spring cylinder 40. Connected to and extending axially upwardly from the connecting link 34 is the sleeve rod 54 slidably extending into the enclosing tube 52. Threadedly secured on the sleeve rod 54 near its upper end in spaced relationship to each other and within the enclosing tube 52 are the upper stop nuts 56 and the lower stop nuts 58. Freely slidable on the sleeve rod 54 between these upper and lower stop nuts 56 and 58 is the magnetic sleeve member 60.

Pivotally mounted exterior of the enclosing tube 52 on a horizontal pivot shaft 62 is a permanent magnet 64 having its pole pieces 68 and 70 closely fitting but not contacting the exterior of the enclosing tube 52 on opposite sides of this enclosing tube 52. As thus constructed this magnet 64 rocks on its pivot shaft 62 because the pole pieces 68 and 70 follow the magnetic sleeve 60 as it moves upwardly and downwardly for limited distances within the enclosing tube 52.

Secured on the magnet 64 for tilting or rocking movement therewith is the mercury switch 32 which, as best seen in Figures 3 and 4, is a single pole double throw switch containing a mercury globule 72 always contacting a center contact and one of the opposite end contacts.

The permanent magnet 64 is vertically adjustable by vertical movement of its pivot shaft 62 accomplished by selection of the desired one of the vertically aligned holes 63 in the vertical pivot support brackets 65 on each side of the magnet 64 (only one bracket 65 being visible) for the purposes that will be made clear herein The brackets 65 are secured at their lower end to the cap 48 and the pivot shaft 62 is spring loaded so that the ends of it may be depressed to be removed from one hole 63 and placed in another.

A protective housing 74 including a removable housing cap 76 is secured on top of the cap 48 with a nozzle 78 through this housing 74 for the passage of wires connected to the switch 32. As best shown in Figures 1 and 2 the buoyancy member 25, the magnetic switch control means 30 and the switch 32 are secured to and supported by flanges 79 at the upper end of a vertical nozzle 80 extending axially upward from the upper reduced neck 14.

No further description of the magnetic switch control means 30 and the switch 32 is deemed necessary as such unit including the buoyancy member 25 is commercially available as Magnetrol Liquid Level Control model A-100-F-VP, with an S-3 switch mechanism.

In operation, the buoyancy member 25 has slightly greater specific gravity than the liquid in the liquid container 10 so that regardless of the height of the liquid in the liquid container 10 the buoyancy member 25 is always supported by the compression spring 38. With the liquid level at a predetermined low level as illustrated in Figure 5 at which time the liquid container 10 begins to fill with liquid, the weight of the buoyancy member 25 compresses spring 38 and pulls the sleeve rod 54 to its lowermost position causing the upper stop nuts 56 to contact the magnetic sleeve 60 and move it to is lower position illustrated in Figure 5.

As the liquid level in the liquid container 10 rises the compression spring 38 has less weight to support and moves slightly upward but without much appreciable movement until the liquid level rises to the upper buoyancy mass 26 because the rod 28 between the buoyancy masses 26 displaces very little liquid. When the liquid level as it rises begins to submerge the upper buoyancy mass 26 the downward pull on the compression spring 38 has decreased to such an extent that the compression spring 38 expands moving the sleeve rod 54 upwardly. During the initial upward movement of the sleeve rod 54 the magnetic sleeve 60 stays at the same horizontal position because it is held there by the pole pieces 68 and 70. Upon further upward movement of the sleeve rod 54 the lower stop nuts 58 contact this magnetic sleeve 60 mechanically forcing it upward whereupon magnetic force causes the pole pieces 68 and 70 to follow it by rotating the magnet 64 on the pivot shaft 62. The magnetic switch control assembly 30 is then in the position illustrated in Figure 6. This tilting of the magnet 64 tilts the switch 32 from the position shown in Figure 3 to that shown in Figure 4 breaking one circuit and closing the other.

When the liquid level begins to descend from the position shown in Figure 6 increased weight of the buoyancy mass 25 will compress the compression spring 38 pulling the sleeve rod 54 downwardly. During the initial part of this downward movement the magnetic sleeve 60 will remain in its upper horizontal position due to the attraction between it and the pole pieces 68 and 70 of the magnet 64. This magnet 64 has built-in friction with its pivot shaft 62 which must be overcome before it tilts in either direction. As the sleeve rod 54 continues to descend the upper stop nuts 56 contact the magnetic sleeve 60 and move it downward to the position shown in Figure 5 whereupon the pole pieces 68 and 70 follow this magnetic sleeve 60 tilting the magnet 64 and the switch 32 with the switch 32 moving from the position shown in Figure 4 to that shown in Figure 3 breaking one circuit and closing the other.

The liquid levels at which the switching action just described occurs may be adjusted prior to insertion of the buoyancy member 25 into the metering vessel 10 by sliding the buoyancy masses 26 upwardly and downwardly on the rod 28 by means of adjusting the set screws 81 in each of these buoyancy masses 26. Such adjustment permits independent calibration of the upper and lower liquid levels.

Referring now to Figures 1, 3 and 4 there can be seen an electrical system for controlling the inlet and outlet valves 18 and 24. A power lead 84 is connected with the center contact 86 of the mercury switch 32, a lead 88 is connected to the forward contact 90 in the mercury switch 32, and a lead 92 is connected to the rear contact 94. The lead 88 is connected to the schematically shown inlet solenoid pilot valve 96 and the lead 92 is connected to the outlet solenoid pilot valve 98. Both solenoid pilot valves 96 and 98 have leads connected to the common power lead 100. In this form of the electrical system there are two circuits each running through the mercury switch 32 with one circuit including the power lead 84, the lead 88 to the inlet solenoid pilot valve 96, and the common power lead 100. The other circuit includes the power lead 84 passing through the mercury switch 32 through the lead 92 to the outlet solenoid pilot valve 98 and the common power lead 100. Thus as the mercury switch 32 is tilted by upward and downward movement of the buoyancy member 25 the circuits to the solenoid pilot valves 96 and 98 are alternately and simultaneously broken and closed.

A gas pressure line 102 from the nozzle 80 is connected to the inlet solenoid pilot valve 96 and a similar pressure line 104 is connected to the outlet solenoid pilot valve 98. The inlet valve 18, which is a pressure responsive valve, is connected by a short pressure line 106 to the inlet solenoid pilot valve 96 and similarly the outlet valve, which is also a pressure responsive valve, is connected by a pressure line 108 to the outlet solenoid pilot valve 98. Each of the inlet valves 18 and outlet valve 24 are normally closed, are opened by the application of pressure and are closed when pressure is bled from them.

Each of the solenoid pilot valves 96 and 98 is a three-way normally closed pilot valve including the exhaust 110 for the inlet solenoid pilot valve 96 and the exhaust 112 for the outlet solenoid pilot valve 98. When the inlet solenoid pilot valve 96 is electrically energized it opens so pressure from pressure line 102 passes through it into the pressure line 106 opening the inlet valve 18 and de-energizing the inlet solenoid pilot valve 96 moves the valve to close it to the passage of gas pressure from line 102 but permits the drainage of back pressure in line 106 out the exhaust 110. The outlet solenoid pilot valve 98 is similarly actuated.

The three-way solenoid pilot valves 96 and 98 may be of any preferred type of which several are readily available on the commercial market. A satisfactory solenoid pilot valve is model X5M-8700 three-way, explosion proof electric solenoid valve manufactured by Skinner Electric Valve Division, The Skinner Chuck Company, New Britain, Connecticut.

The inlet and outlet valves 18 and 24 may be of any preferred type of pressure responsive valve such as the well known diaphragm motor valves and accordingly no further description of them is necessary.

The liquid container 10 may be supported by any suitable framework or structure and, for this purpose, the supports 114 connected to the liquid container 10 and the base 116 are illustrated. A liquid level gauge 118 may be provided so that the level of liquid in the liquid container 10 is visible and a pressure gauge 120 may be provided in the nozzle 80. A gas equalizing connection 124 for the liquid container 10 is also provided.

A counter 122, such as in the lead 92 to the outlet solenoid pilot valve 98 is provided so that an accurate count is automatically maintained each time the liquid compartment 10 fills and empties. The counter 122 is diagrammatically illustrated, but any conventional counter mechanism or recorder may be used, a number of which are on the commercial market and, accordingly, no detailed description thereof is deemed necessary.

In operation of the apparatus in Figures 1 through 6, liquid is permitted to enter the inlet line 16 when the inlet valve 18 is open, which liquid flows into the interior of the liquid container 10 through the flow line 20, the outlet valve 24 being closed. When this begins to occur the buoyancy member 25, the magnetic control 30 and the switch 32 are in the position shown in Figures 5 and 3. As the liquid level rises the weight of the buoyancy member 25 on the compression spring 38 is reduced permitting the spring 38 to expand until, upon the liquid level reaching a predetermined upper level, the compression spring 38 pushes the sleeve rod 54 to such a height that the lower stop nuts 58 move the magnetic sleeve 60 upwardly causing the magnet 64 and the switch 32 to tilt to the positions illustrated in Figures 4 and 6. This tilting of the switch 32 closes the circuit to the outlet solenoid pilot valve 98 and simultaneously opens the circuit to the inlet pilot solenoid valve 96 whereupon gas pressure from the pressure line 104 opens the outlet valve 24 and simultaneously back pressure in the line 106 from the inlet valve 18 is bled through the inlet solenoid pilot valve 96 closing this inlet valve 18 causing the liquid level to begin to descend. As the liquid level descends from its uppermost position the outlet solenoid pilot valve 98 continues to be energized and opened holding the outlet valve 24 open until the liquid level reaches the position illustrated in Figure 5 whereupon the weight of the buoyancy member 25 pulls the magnetic sleeve 60 downwardly causing a tilting of the magnet 64 and switch 32 to the positions illustrated in Figures 3 and 5 thereby de-energizing the outlet solenoid pilot valve 98 and energizing the inlet solenoid pilot valve 96 simultaneously thereby permitting back pressure from pressure line 108 connected to the outlet valve 24 to drain closing the outlet valve 24 and simultaneously permitting pressure in line 102 to open the inlet valve 18. When this occurs the liquid level in the liquid container 10 begins to rise repeating the cycle.

Means of calibrating the metering vessel 10 without the necessity of access to portions of the apparatus to which fluid has access are provided. As shown in Figure 1, the lower half of the metering vessel 10 holds a different volume of liquid than the upper half because the lower reduced diameter compartment 15 is of greater diameter or cross-sectional area, and hence volume, than the upper reduced diameter portion 14. Because the permanent magnet 64 is vertically adjustable such adjustment of the vertical magnet 64 provides a means for adjusting the height of the buoyancy member 25 at which such buoyancy member 25 will move the permanent magnet 64 to a position to operate the mercury switch 32. Without the differences in cross-sectional areas in the compartments 14 and 15 and hence differences in volumes between the upper and lower portions of the metering vessel 10, this adjustment of the height at which the buoyancy member 25 will cause operation of the mercury switch 32 would have no effect upon the volume being metered as the upper and lower liquid levels always remain the same distance apart. However, by having the lower portion of the metering vessel 10 contain a different volume of the upper portion this change of levels at which the valves 18 and 24 are operated results in a different volume being between the upper and lower liquid levels and therefore provides a means for calibrating the apparatus.

While the structure of Figure 1 has been described as operating at above atmospheric pressure, it may be in certain instances the structure will be operated at atmospheric pressure or less in which event extraneous gas at a suitable pressure may be supplied to the supply lines 102 and 104 for actuation of the inlet and outlet valves 18 and 24.

Referring now to Figure 7 there is illustrated a modification in which modification parts which are the same as in Figure 1 have the same numbers and modified parts have the suffix "a."

The structure and mode of operation of the modification of Figure 7 is identical to that shown in Figure 1 except that the pressure lines 102 and 104 and the solenoid pilot valves 96 and 98 have been eliminated and instead of pressure responsive inlet valves 18 and outlet valves 24 there are provided in the inlet line 16 and the outlet line 22 the electric motor two-way inlet and outlet valves 18a and 24a. These electric motor inlet and outlet valves 18a and 24a are directly actuated by the same electrical system that was connected to the inlet solenoid pilot valve 96 and outlet solenoid pilot valve 98 illustrated in Figure 1. No gas pressure is used in operating these electric motor inlet and outlet valves 18a and 24a. Such electric motor two-way valves are readily available commercially and a satisfactory valve is General Control Hydramotor Valve, Catalog No. H–2V1A1A4 manufactured by General Controls Co., Glendale, California, and no further description of such inlet and outlet valves 18a and 24a is necessary.

All other parts and mode of operation are identical to that described in relation to the example illustrated in Figure 1.

Referring now to Figure 8 there is illustrated the wiring diagram of another modification which modification is in all respects identical to the example shown in Figure 1 except in the electrical system. Parts which are the same as in Figure 1 have the same numbers and modified parts have the suffix "b." In this form shown in Figure 8 there is a single electrical circuit operating the two solenoid pilot valves rather than the two circuits illustrated in Figure 1. A single throw switch 32b instead of the double throw switch 32 of Figure 1 is placed in series with the inlet solenoid pilot valve 96 and an outlet solenoid pilot valve 98b. The inlet solenoid pilot valve 96 is identical to that illustrated in Figure 1 but the outlet solenoid pilot valve 98b is normally open when de-energized rather than normally closed. As thus arranged, when the circuit of Figure 8 is closed current passes through the power lead 84, the single throw switch 32b, the lead 88 to the inlet solenoid pilot valve 96, from this inlet solenoid pilot valve 96 through the lead 99 to the outlet solenoid pilot valve 98b, and to the power lead 100b. Closing this circuit opens the inlet solenoid pilot valve 96 and simultaneously closes the solenoid pilot valve 98b thereby simultaneously opening the inlet valve 18 and closing the outlet valve 24. Breaking the circuit by opening the switch 32b will simultaneously de-energize the inlet solenoid pilot valve 96 closing the inlet valve 18 and likewise de-energize the outlet solenoid pilot valve 98b which, because it is opposite acting from the inlet solenoid pilot valve 96, will open the outlet valve 24.

In this wiring diagram shown in Figure 8 the electrical counter 122b has been connected to the power lead 100b. Other than as just described all other parts and the mode of operation are identical to that shown in Figures 1 through 6. It is to be understood, of course, that this modification of Figure 8 may be used with oppositely acting electric motor valves such as illustrated in Figure 7.

While the present invention has been described in connection with metering oil, it will be understood that the invention may be used for metering any type of liquid, under any and all pressure conditions and in combinations with various other apparatus. In addition, rearrangement and substitution of parts will readily suggest themselves to those skilled in the art and such are encompassed within the spirit of the invention and the scope of the appended claims.

The invention therefore is well suited to carry out the objects and attain the advantages and ends mentioned as well as others inherent therein. Accordingly, the invention is to be limited only by the spirit thereof and the scope of the appended claims.

What is claimed is:

1. A liquid metering apparatus comprising; a liquid container having a main liquid compartment and mutually aligned liquid compartments extending above and below said main liquid compartment, the mutually aligned compartments being of materially smaller cross sections than said main liquid compartment and being in liquid communication therewith; liquid inlet and outlet passages to said liquid container; pressure responsive inlet and outlet valve elements in said passages; a buoyancy member comprised of a pair of buoyancy masses rigidly connected together, one each of said buoyancy masses being disposed in one each of said aligned liquid compartments, said buoyancy member being movable with changing liquid level in said aligned liquid compartments; and a valve control assembly for said inlet and outlet valve elements, said valve control assembly including, an electrical system adapted to cause alternate closing and opening of the inlet and outlet valve elements simultaneously, said electrical system including an inlet and an outlet electrically operated pilot valve and switch means adapted in a first position to operate the electrical system to cause simultaneous closing and opening of the inlet and outlet pilot valves respectively and in a second position to cause simultaneous closing and opening of the outlet and inlet pilot valves respectively, a pressure line through the inlet pilot valve to the inlet pressure responsive valve element and a pressure line through the outlet pilot valve to the outlet pressure responsive valve element whereby actuation of said pressure responsive inlet and outlet valve elements is controlled by said inlet and outlet pilot valves respectively, and magnetic switch control means actuated by movement of the buoyancy member to a predetermined upper level in the liquid compartment above the main liquid compartment to move the switch means to the first position emptying the liquid container and upon movement of the buoyancy member to a predetermined low level in the liquid compartment below the main liquid compartment to move the switch means to the second position filling the liquid container.

2. A liquid metering apparatus comprising, a liquid container having a main liquid compartment and mutually aligned upper and lower liquid compartments extending above and below said main liquid compartment, the mutually aligned compartments being of materially smaller cross section than that of said main liquid compartment and being in liquid communication therewith; liquid inlet and outlet passages to said liquid container; inlet and outlet valve elements in said passages; a buoyancy member comprised of a pair of buoyancy masses rigidly connected together, one each of said buoyancy masses being disposed in one each of said upper and lower liquid compartments, said buoyancy member being movable with changing liquid level in said aligned liquid compartments; and a valve control assembly for said inlet and outlet valve elements, said valve control assembly including, an electrical system adapted to cause alternate closing and opening of the inlet and outlet valve elements simultaneously, said electrical system including a switch adapted in a first position to operate the electrical system to cause simultaneous closing and opening of the inlet valve and outlet valve elements respectively and in a second position to cause simultaneous closing and opening of the outlet valve and inlet valve elements respectively, and switch control means actuated by movement of said buoyancy member and including an imperforate barrier between the liquid container and the switch, said switch control means adapted upon movement of said buoyancy member to a predetermined upper level in the liquid compartment above the main liquid compartment to move the switch to the first position draining the liquid container and upon movement of the buoyancy member to a predetermined low level in the liquid compartment below the main liquid compartment to move the switch means to the second position filling the liquid container.

3. The apparatus of claim 2 in which the upper liquid compartment has a different cross sectional area adapted to be filled with liquid than the cross sectional area of the lower liquid compartment and adjustable means in the switch control means exterior of the imperforate barrier for varying the vertical position of the buoyancy member at which the switch is actuated.

4. The invention of claim 2 in which the inlet and outlet valve elements are electric motor valves.

5. In combination, a liquid container having different cross-sectional areas in vertical relationship adapted to be filled with liquid, inlet and outlet passages connected to said liquid container and inlet and outlet valve elements in said passages, movable means in the liquid container movable vertically in response to changing liquid levels in the different cross-sectional areas, a valve control assembly for said inlet and outlet valve elements, said valve control assembly adapted to cause alternate opening and closing of the inlet and outlet valves simultaneously at two liquid levels in a constant spaced relationship, said valve control assembly being actuated by said movement of the movable means, and adjustable means exterior of the liquid container for varying the vertical position of the movable means between said different cross-sectional areas at which the valve control assembly is actuated thereby establishing two new spaced liquid levels whereby the volume of liquid being metered is varied.

6. A liquid metering apparatus comprising; a liquid container; liquid inlet and outlet passages to said liquid container; pressure responsive inlet and outlet valve elements in said passages; a buoyancy member comprised of a pair of buoyancy masses rigidly connected together, said buoyancy member being movable with changing liquid level in said liquid container; and a valve control assembly for said inlet and outlet valve elements, said valve control assembly including, an electrical system adapted to cause alternate closing and opening of the inlet and outlet valve elements simultaneously, said electrical system including an inlet and an outet electrically operated pilot valve and switch means adapted in a first position to operate the electrical system to cause simultaneous closing and opening of the inlet and outlet pilot valves respectively and in a second position to cause simultaneous closing and opening of the outlet and inlet pilot valves respectively, a pressure line through the inlet pilot valve to the inlet pressure responsive valve element and a pressure line through the outlet pilot valve to the outlet pressure responsive valve element whereby actuation of said pressure responsive inlet and outlet valve elements is controlled by said inlet and outlet pilot valves respectively, and magnetic switch control means actuated by a movement of the buoyancy member to a predetermined upper level to move the switch means to the first position emptying the liquid container and upon movement of the buoyancy member to a predetermined low level to move the switch means to the second position filling the liquid container.

7. A liquid metering apparatus comprising, a liquid container having different cross-sectional areas in vertical relationship adapted to be filled with liquid; liquid inlet and outlet passages to said liquid container and inlet and outlet valve elements in said passages; movable means in the liquid container movable vertically in response to changing liquid levels in the different cross-sectional areas; and a valve control assembly for said inlet and outlet valve elements, said valve control assembly including, an electrical system adapted to cause alternate closing and opening of the inlet and outlet valve elements simultaneously at two liquid levels in a constant spaced relationship, said electrical system including a switch adapted in a first position to operate the electrical system to cause simultaneous closing and opening of the inlet valve and outlet valve elements respectively and in a second position to cause simultaneous closing and opening of the outlet valve and inlet valve elements respectively and switch control means actuated by vertical movement of the movable means and including an imperforate barrier between the liquid container and the switch, said switch control means adapted upon movement of said movable means to a predetermined upper level to move the switch to the first position draining the liquid container and upon movement of the movable means to a predetermined low level to move the switch to the second position filling the container, and adjustable means in the switch control means exterior of the imperforate barrier for varying the vertical position of the movable means between said different cross-sectional areas at which the switch is actuated thereby establishing two new spaced liquid levels whereby the volume of liquid being metered is varied.

8. A liquid metering apparatus comprising, a liquid container having a main liquid compartment and mutually aligned upper and lower liquid compartments extending above and below said main liquid compartment, the mutually aligned compartments being of smaller cross-sectional area than that of said main liquid compartment and being in liquid communication therewith, said upper liquid compartment having a different cross-sectional area than the cross-sectional area of the lower liquid compartment; liquid inlet and outlet passages to said liquid container; inlet and outlet valve elements in said passages; a buoyancy member comprised of a pair of buoyancy masses rigidly connected together, one each of said buoyancy masses being disposed in one each of said liquid compartments, said buoyancy member being movable with changing liquid level in said aligned liquid compartments; a valve control assembly for said inlet and outlet valve elements, said valve control assembly adapted to cause alternate opening and closing of the inlet and outlet valves simultaneously at two different constantly spaced liquid levels, one each of said liquid levels being in one each of said upper and lower liquid compartments, said valve control assembly being actuated by said movement of the buoyancy member; and adjustable means exterior of the liquid container for varying the vertical position of the buoyancy member at which the valve control assembly is actuated thereby establishing two new spaced liquid levels whereby the volume of liquid being measured is varied.

References Cited in the file of this patent

UNITED STATES PATENTS

| | | |
|---|---|---|
| 1,114,360 | Hornung | Oct. 20, 1914 |
| 2,576,561 | Binford | Nov. 27, 1951 |
| 2,620,412 | Ford | Dec. 2, 1952 |
| 2,794,342 | Franklin | June 4, 1957 |
| 2,831,350 | Banks et al. | Apr. 22, 1958 |
| 2,853,877 | Smith | Sept. 30, 1958 |